(12) United States Patent
Nakayama

(10) Patent No.: US 11,743,415 B2
(45) Date of Patent: Aug. 29, 2023

(54) INFORMATION PROCESSING METHOD, INFORMATION PROCESSING APPARATUS, AND INFORMATION PROCESSING SYSTEM

(71) Applicant: CANON KABUSHIKI KAISHA, Tokyo (JP)

(72) Inventor: Takahiro Nakayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/079,215

(22) Filed: Oct. 23, 2020

(65) Prior Publication Data
US 2021/0133450 A1 May 6, 2021

(30) Foreign Application Priority Data

Oct. 31, 2019 (JP) .................................. 2019-199390

(51) Int. Cl.
*G09B 5/02* (2006.01)
*G09B 19/00* (2006.01)
(Continued)

(52) U.S. Cl.
CPC .......... *H04N 5/265* (2013.01); *G06K 7/1417* (2013.01); *G06T 11/00* (2013.01); *G06V 10/22* (2022.01);
(Continued)

(58) Field of Classification Search
None
See application file for complete search history.

(56) References Cited

U.S. PATENT DOCUMENTS 8,914,472 B1* 12/2014 Lee ...................... G06T 19/006
709/219
2009/0055476 A1* 2/2009 Markus .................. G06Q 10/00
709/204
(Continued)

FOREIGN PATENT DOCUMENTS

JP 2013140563 A 7/2013

OTHER PUBLICATIONS

Roll-2-Roll Technologies LLC, "Product Manual: Unpacking Instructions". Apr. 3, 2017, URL: https://www.youtube.com/watch?v=PDb4L3-27eQ (Year: 2017).*

(Continued)

*Primary Examiner* — David H Chu
(74) *Attorney, Agent, or Firm* — Canon U.S.A., Inc. IP Division

(57) ABSTRACT

A display control unit causes a display unit to display a captured image of a product captured by an image capturing unit. A first obtaining unit obtains product information relating to initial setting of the product based on the captured image data. A second obtaining unit obtains a determination result of an installation state of the product based on the captured image data and the product information of the product. A third obtaining unit obtains combined image data expressing a combined image obtained by combining the captured image captured by the image capturing unit and an instruction image of installation work to be performed on the product by a user, depending on the installation state obtained by the second obtaining unit. The display control unit causes the display unit to display the combined image based on the combined image data.

16 Claims, 15 Drawing Sheets

(51) Int. Cl.
*G06V 20/20* (2022.01)
*H04N 5/265* (2006.01)
*G06T 11/00* (2006.01)
*G06K 7/14* (2006.01)
*G06V 10/22* (2022.01)
*G06K 7/10* (2006.01)

(52) U.S. Cl.
CPC .............. *G06V 20/20* (2022.01); *G09B 5/02* (2013.01); *G09B 19/003* (2013.01); *G06K 2007/10504* (2013.01); *G06V 2201/09* (2022.01)

(56) References Cited

U.S. PATENT DOCUMENTS

| | | | | |
|---|---|---|---|---|
| 2012/0249588 | A1* | 10/2012 | Tison | G01C 21/206 345/633 |
| 2013/0114100 | A1* | 5/2013 | Torii | H04N 1/00344 358/1.14 |
| 2014/0171039 | A1* | 6/2014 | Bjontegard | H04L 67/38 455/414.1 |
| 2014/0378023 | A1* | 12/2014 | Muthyala | G06T 19/00 446/91 |
| 2015/0130835 | A1* | 5/2015 | Daly | G06T 1/60 345/633 |
| 2016/0134484 | A1* | 5/2016 | Tanaka | H04L 41/12 345/633 |
| 2016/0189288 | A1* | 6/2016 | Todeschini | G06Q 30/0643 705/27.2 |
| 2016/0300109 | A1* | 10/2016 | Aonuma | G02B 27/017 |
| 2016/0307459 | A1* | 10/2016 | Chestnut | G06F 3/14 |
| 2016/0314623 | A1* | 10/2016 | Coleman | G06T 19/006 |
| 2018/0150791 | A1* | 5/2018 | Stansell | G06T 7/50 |
| 2018/0165978 | A1* | 6/2018 | Wood | G10L 15/22 |
| 2018/0336732 | A1* | 11/2018 | Schuster | G06Q 10/0875 |
| 2019/0266804 | A1* | 8/2019 | Kohlhoff | G06T 13/20 |
| 2019/0384978 | A1* | 12/2019 | Lee | G06K 9/22 |

OTHER PUBLICATIONS

Fraunhofer IGCV, "MA2RA—Manual Assembly Augmented Reality Assistant", May 17, 2019, URL: https://www.youtube.com/watch?v=CgU-aqCRMtw (Year: 2019).*

Demodern—Creative Technologies, "AR Build Assist", 2017, URL: https://vimeo.com/245398726?embedded=true&source=vimeo_logo&owner=234267 (Year: 2017).*

* cited by examiner

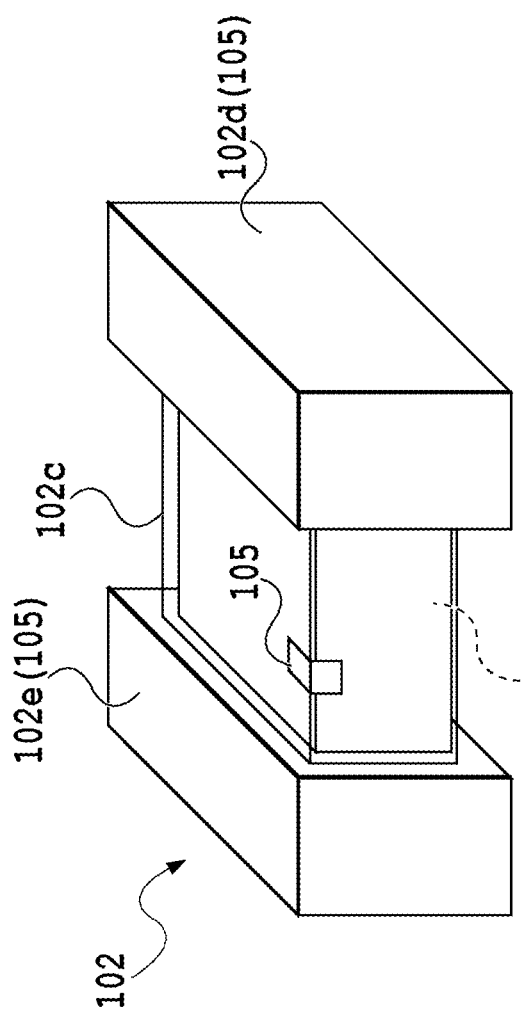
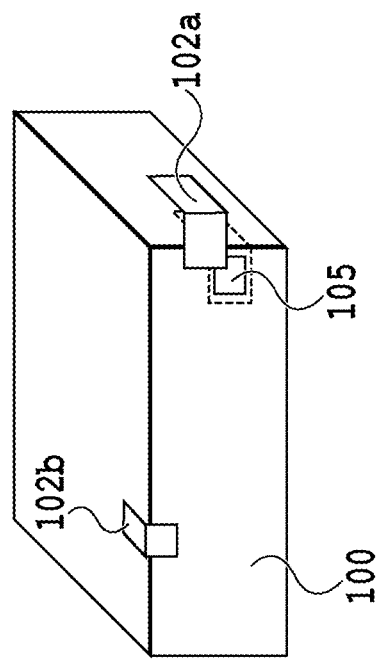
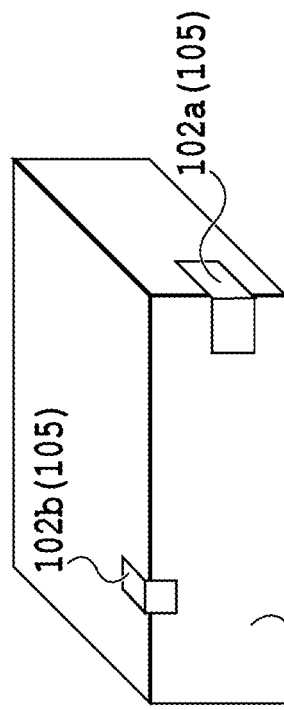
FIG.3A
FIG.3B
FIG.3C

| CATEGORY (NAME) | POSITION | PRIORITY | CONFIRMATION IDENTIFIER | DETERMINATION METHOD | ORIENTATION IDENTIFICATION |
|---|---|---|---|---|---|
| CUSHIONING MATERIAL_(RIGHT) 102e | ENTIRE PRODUCT | 1 | COLOR OF FOAMED POLYSTYRENE (WHITE) | ABSENT | UNNECESSARY |
| | | | ENGRAVING ON FOAMED POLYSTYRENE | ABSENT | |
| CUSHIONING MATERIAL_(LEFT) 102d | ENTIRE PRODUCT | 1 | COLOR OF FOAMED POLYSTYRENE (WHITE) | ABSENT | UNNECESSARY |
| | | | ENGRAVING ON FOAMED POLYSTYRENE | ABSENT | |
| PROTECTION VINYL PRODUCT 102c | ENTIRE PRODUCT | 2 | PRINT ON PROTECTION VINYL PRODUCT | ABSENT | UNNECESSARY |
| | | | ORANGE TAPE DIRECTLY BELOW PROTECTION VINYL PRODUCT | PRESENT | |
| ORANGE TAPE (102a) | LOCATION 1 | 3 | COLOR OF TAPE (ORANGE) | ABSENT | NECESSARY |
| | | | DESIGN DIRECTLY BELOW TAPE | PRESENT | |
| ORANGE TAPE (102b) | LOCATION 2 | 4 | COLOR OF TAPE (ORANGE) | ABSENT | NECESSARY |
| | | | DESIGN DIRECTLY BELOW TAPE | PRESENT | |

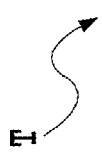

FIG.4

INFORMATION PROCESSING METHOD, INFORMATION PROCESSING APPARATUS, AND INFORMATION PROCESSING SYSTEM

BACKGROUND OF THE INVENTION

Field of the Invention

The present disclosure relates to a technique in which an image obtained by capturing a product is used to display an image for assisting initial installation of a product.

Description of the Related Art

Precision devices such as electronic devices are covered with and held in place by multiple packaging materials to avoid breakage and the like in a distribution process and are shipped as products. Accordingly, a user who purchases such a product needs to perform installation work such as unpacking, initial installation, and initial setting of the arrived product. Such installation work of a product has become complex with progress of electronic devices and is cumbersome and difficult work for an ordinary user.

In recent years, a technique of visually assisting work of a user by using an augmented reality (AR) technology in which digital information is superimposed on an actual image has been proposed and performed.

Japanese Patent Laid-Open No. 2013-140563 discloses a technique of presenting an error recovery operation for an image forming apparatus in an error state by means of AR guidance. Specifically, in the case where the image forming apparatus connected to an external server via a network falls into an error state, the external server analyzes an error log and sends AR information to a mobile device of a user, the AR information including the AR guidance that presents the error recovery operation. The user performs work for error recovery by referring to the AR information displayed on the mobile device. However, in the technique disclosed in Japanese Patent Laid-Open No. 2013-140563, the image forming apparatus needs to be connected to the external server via the network. Accordingly, this technique cannot be applied to initial installation work of a product at arrival that is in a packaged state.

SUMMARY OF THE INVENTION

An object of the present disclosure is to enable assistance of an initial installation work of a product by displaying an image.

The present disclosure is an information processing method comprising: an image capturing step of capturing an image of a product and obtaining captured image data; a first obtaining step of obtaining product information relating to initial installation of the product based on the captured image data; a second obtaining step of obtaining a determination result of an installation state of the product based on the captured image data and the product information; a third obtaining step of obtaining combined image data expressing a combined image obtained by combining the captured image and an instruction image of installation work to be performed on the product by a user, depending on the determined installation state; and a display control step of causing a display unit to display the combined image based on the combined image data.

The present disclosure can assist an initial installation work of a product by displaying an image.

Further features of the present disclosure will become apparent from the following description of exemplary embodiments with reference to the attached drawings.

BRIEF DESCRIPTION OF THE DRAWINGS

FIGS. 3A to 3C are diagrams illustrating an example of a printer main body and inner packaging materials;

FIG. 4 is a diagram illustrating an example of a table storing packaging material information;

DESCRIPTION OF THE EMBODIMENTS

A first embodiment of the present disclosure is described below with reference to the drawings.

<Configuration of Information Processing System>

An information processing system according to the embodiment performs processing for assisting initial installation work of a product by means of augmented reality (AR) guidance, the product including a predetermined device packaged in packaging materials.

Figure 1:
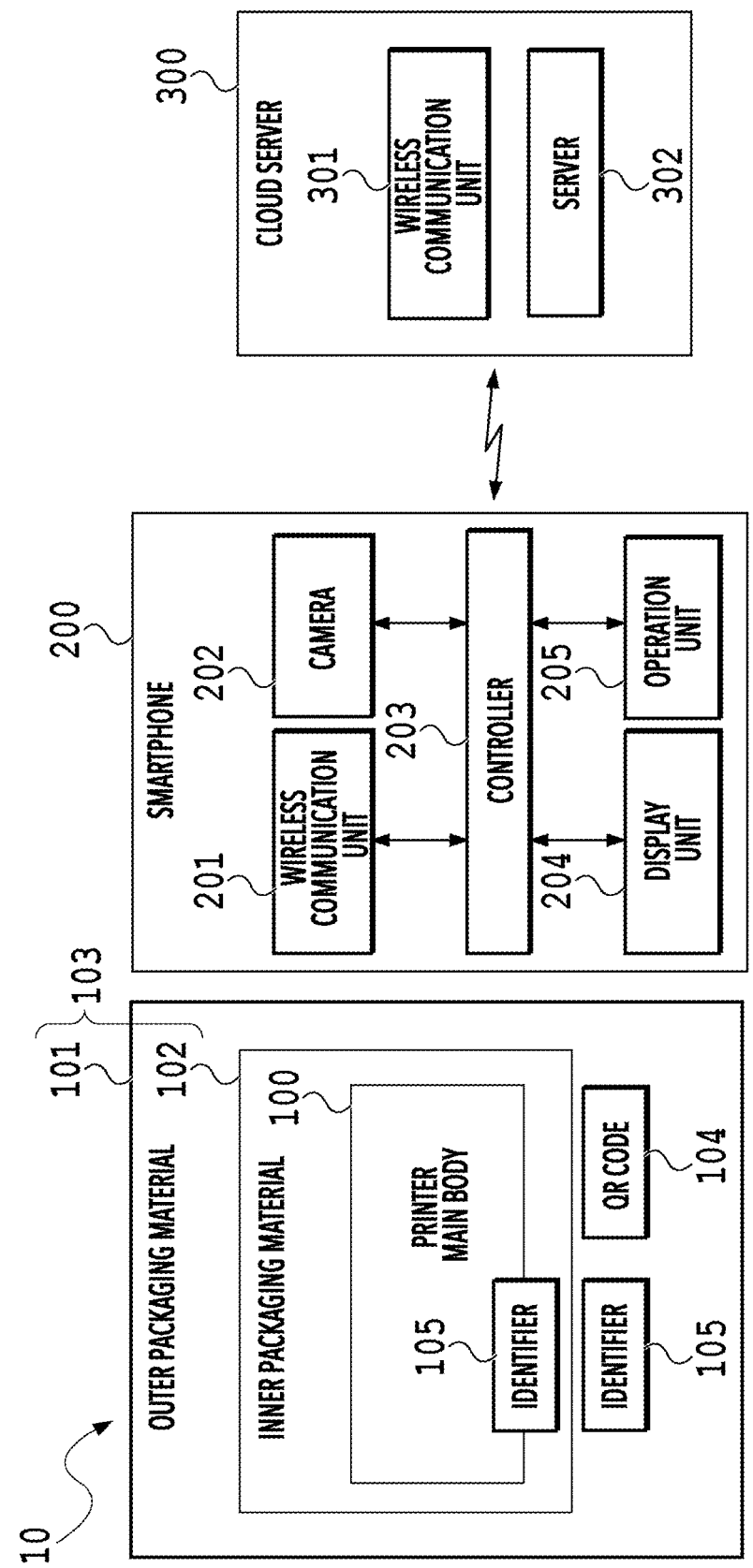
FIG. 1 is a diagram illustrating a configuration of an information processing system in an embodiment and a product.

FIG. 1 is a diagram illustrating a configuration of the information processing system in the embodiment and a product 10 that is a target of the initial installation work. The information processing system in the embodiment includes a terminal 200 that is operable by a user and a cloud server 300 that is an external server on a network communicable with the terminal 200. Note that, in the embodiment, description is given by using a printer main body as an example of a device main body packaged in packaging materials.

In the information processing system of the embodiment, a multifunction mobile phone (hereinafter, referred to as smartphone) 200 is used as the terminal. The smartphone 200 is provided with a wireless communication unit 201 that can communicate with a printer main body 100 and the cloud server 300 and a camera (image capturing unit) 202 that obtains captured image data of an image capturing part of or the entire product 10, a two-dimensional code (QR code) 104, or an identifier 105. The smartphone 200 is further provided with a controller 203, a display unit (display unit)204 that can display images captured by the camera 202, AR images to be described later, and the like, and an operation unit 205 on which input operations are performed.

The controller 203 is formed of a processor such as a central processing unit (CPU) and has a function as a control unit that controls the aforementioned units, a function as a determination unit that performs determination processing to be described later, and a function as a generation unit that generates image data. Specifically, the controller 203 generates instruction image data depicting an instruction image of an instruction such as what the user is to do next, based on later-described product information and the like obtained from the later-described cloud server 300. Moreover, the controller 203 performs control of generating combined image data (Augmented Reality image data (AR image data)) by combining the generated instruction image data and the captured image data obtained by the camera 202 and displaying a combined image (AR image) on the display unit 204 based on the generated combined image data. As described above, the controller 203 in the embodiment has functions of performing control operations of the units and obtaining various types of information, and functions as a display control unit, a first obtaining unit, a second obtaining unit, and a third obtaining unit of the present disclosure.

Although the smartphone 200 is used as the terminal in the embodiment, a tablet personal computer (PC), a laptop PC, or the like may be used as the terminal instead of the smartphone 200. In other words, the terminal used in the information processing system of the embodiment may be any device that has functions equivalent to the camera 202, the display unit 204, the operation unit 205, the wireless communication unit 201, and the controller 203.

The cloud server 300 includes a wireless communication unit 301 that performs wireless communication with the network and a server 302 that supplies product information for performing AR guidance relating to the initial installation of the product 10 to the smartphone 200. The product information supplied from the cloud server 300 includes, for example, the following information:

(a) product state identification data
(b) packaging box orientation identification data
(c) printer main body orientation identification data
(d) packaging material information table
(e) unpacking steps.

The product information varies depending on the type of the printer being the target and the cloud server 300 supplies information optimal for the printer being the target.

A product used in the embodiment is described. As illustrated in FIG. 1, the product 10 in the embodiment includes the printer main body 100, packaging materials 103 in which the printer main body 100 is packaged, and the identifiers 105 provided respectively to the packaging materials 103 and the printer main body 100. The packaging materials 103 in the embodiment include an inner packaging material 102 in which the printer main body 100 is packaged and a packaging box 101 that is an outer packaging material housing the printer main body 100 packaged in the inner packaging material 102.

An outer side of the packaging box 101 is provided with the identifier 105 and the QR code 104 for embedding the product information. The identifier 105 is a collective term for an identification symbol whose image (identifier image) expressing the identifier is read to obtain various pieces of product information associated with the read image data and includes, for example, the following objects:

1. brand logo
2. printer packaging material itself
3. part of a design embedded in a printer case
4. pictogram symbols
5. QR code
6. digital watermarks.

Figure 2:
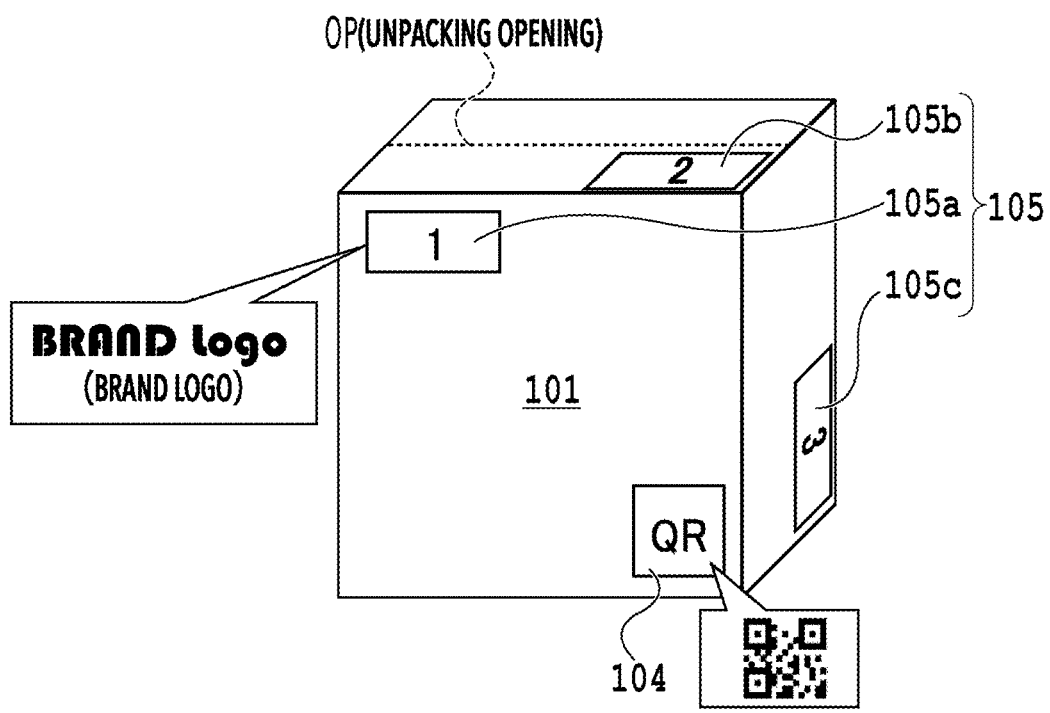
FIG. 2 is a perspective view illustrating an example of a packaging box.

FIG. 2 illustrates an example of the packaging box 101 forming an outer shell of the product 10. Note that FIG. 1 illustrates a state where the product 10 has just arrived, that is a state before unpacking of the product. Outer surfaces of the packaging box 101 are provided with the identifier 105 and the two-dimensional code (QR code (product name)) 104 including specification information for specifying the product. In this example, various types of identifiers 105*a*, 105*b*, and 105*c* (see FIG. 2) are printed on different outer surfaces of the packaging box 101 as the identifier 105.

The QR code 104 includes information for specifying the printer main body. Reading the QR code 104 with the smartphone 200 and sending the read information by accessing the cloud server 300 on the network allows the controller 203 to obtain information (product information) relating to the product 10 corresponding to the QR code 104 from the cloud server 300.

The identifier 105 is formed of symbols in which various pieces of information are embedded. For example, the identifier 105*a* is a logo of a manufacturer used as the identifier. The smartphone 200 reads the identifier 105*a* with the camera 202 and identifies the orientation of the packaging box 101 and the location of an unpacking opening OP based on the read information. In the embodiment, although the QR code 104 and the identifier 105 are provided at different positions, a symbol collectively including the information expressed by the QR code 104 and the information expressed by the identifier 105 may be printed on the outer side of the packaging box 101 as the identifier.

FIGS. 3A to 3C are diagrams illustrating an example of the printer main body 100 and the inner packaging material 102 in which the printer main body 100 is packaged. In this example, the inner packaging material 102 includes a first inner packaging material 102*a*, a second inner packaging material 102*b*, a third inner packaging material 102*c*, a fourth inner packaging material 102*d*, and a fifth inner packaging material 102*e*. The first inner packaging material 102*a* and the second inner packaging material 102*b* are tape-shaped members (orange tapes) used to hold movable portions and the like provided in the printer main body 100 in place and protect them, and are attached to parts of an outer surface of the printer main body 100 to be capable of being peeled off. The third inner packaging material 102*c* is a sheet-shaped or bag-shaped member (protective vinyl product) covering the entire printer main body 100. The fourth inner packaging material 102*d* and the fifth inner packaging material 102*e* are cushioning materials covering left and right portions of the printer main body 100 covered with the third inner packaging material 102*c* and have a function of holding the printer main body 100 in place in the packaging box 101 and protecting it.

The first inner packaging material 102*a*, the second inner packaging material 102*b*, the fourth inner packaging material 102*d*, and the fifth inner packaging material 102*e* illustrated in FIGS. 3A and 3B have a function of themselves being the identifier 105 in addition to the function of holding the printer main body 100 in place and protecting it. Specifically, presence or absence of each of the first inner packaging material 102*a*, the second inner packaging material 102b, the fourth inner packaging material 102d, and the fifth inner packaging material 102e is information indicating whether the inner packaging material is removed or not. Moreover, a mode in which the packaging material 102a and the identifier 105 are independently provided as illustrated in FIG. 3C may be employed.

FIG. 4 is a diagram illustrating an example of a packaging material information table provided in the cloud server 300. In the packaging material information table (hereinafter, simply referred to as table T), information (product information) for correctly removing all of the packaging materials 103 in the product 10 including the packaged printer main body 100 in the correct order is stored. Items of the table T include "category (name)", "position", "priority", "confirmation identifier", "determination method", "orientation identification", and the like. Information as described below is stored in these items.

The item of "category (name)" stores information indicating the categories or names of all packaging materials 103 in the product 10 being the target.

The item of "position" stores position information of each packaging material 103 being the target. In this example, the position information includes information such as "entire product", "location (1)", and "location (2)". The "entire product" means that the packaging material spreads over the entire product, the "location (1)" indicates the portion where the orange tape 102a is provided, and the "location (2)" indicates the portion where the orange tape 102b is provided.

The item "priority" stores information indicating the order of the removable of the packaging materials 103. In this example, the packaging materials 103 are removed in the ascending order of the numbers in the "priority".

The item "confirmation identifier" stores information on the identifiers used to recognize removal of the packaging materials 103. Specifically, it is recognized that each packaging material 103 is removed in the case where the information of the corresponding identifier stored in this item is confirmed or oppositely is not confirmed by image recognition performed on the position of the packaging material 103.

The item "determination method" stores information on a state of each identifier in which it is determined that the corresponding packaging material is removed. Specifically, in each of the determination methods in which the item of the determination method is "absent", it is determined that the packaging material is removed in the case where the identifier is absent at a target position. Meanwhile, in each of the determination methods in which the item of the determination method is "present", it is determined that the packaging material is removed in the case where the presence of the identifier is confirmed.

The item "orientation identification" stores information on whether identification of the orientation of the printer main body 100 is necessary for identifying the position of each packaging material 103. The packaging materials 103 include packaging materials whose positions are identifiable depending on the orientation of the printer main body 100 and packaging materials whose positions are identifiable irrespective of the orientation of the printer main body 100 and information of the item "orientation identification" is thus necessary. For example, in the case where the packaging material 103 is a packaging material that covers the entire printer, the position of the packaging material 103 is obvious and thus the identification of the orientation of the printer main body 100 is unnecessary. Meanwhile, in the case where the packaging material 103 is provided in one portion of the printer main body 100, the position of the packaging material 103 can be correctly recognized only by recognizing the orientation of the printer main body 100.

<Process for AR Guidance>

Figure 5:
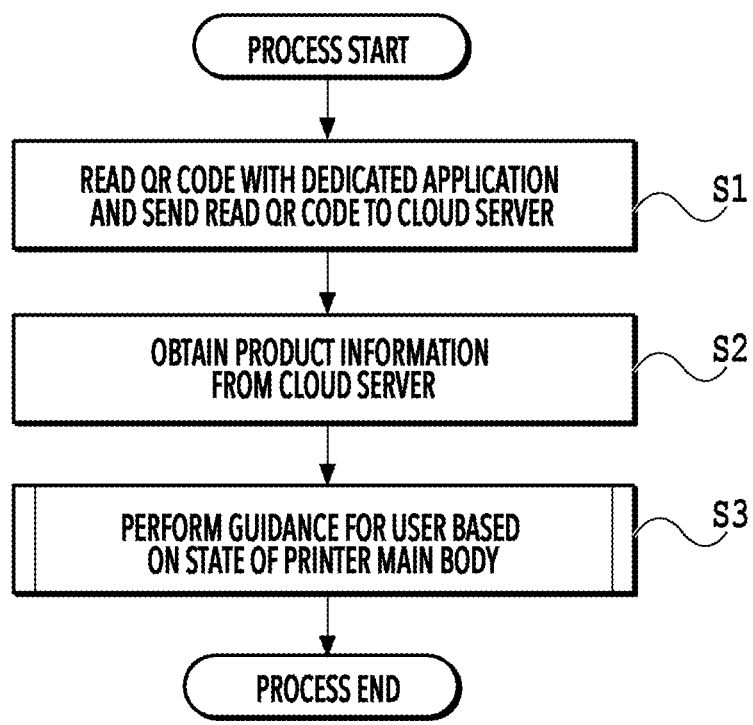
FIG. 5 is a flowchart illustrating a process of performing AR guidance.

FIG. 5 is a flowchart illustrating a process performed in the case where the initial installation work of the product 10 is assisted by means of AR guidance. Note that S attached to the step numbers in the flowcharts illustrated in FIGS. 5, 6, and 12 means step.

In the case where the user inputs a smartphone image capturing start instruction, the controller 203 activates a dedicated application on the smartphone and starts image capturing with the camera 202. In the case where the user directs the camera 202 toward the QR code printed on the packaging box 101 in this state, the controller 203 extracts and reads the QR code from image data captured by the camera 202 and sends the read QR code from the wireless communication unit 201 to the cloud server 300 on the network (S1). The cloud server 300 sends information (product information) on the product corresponding to the received QR code to the smartphone 200 via the network. The smartphone 200 receives the product information sent from the cloud server 300 via the wireless communication unit 201 and the controller 203 obtains the product information (S2). Thereafter, the controller 203 of the smartphone 200 performs AR guidance of initial setting for the user on the display unit 204 based on the obtained product information (S3).

Figure 6:
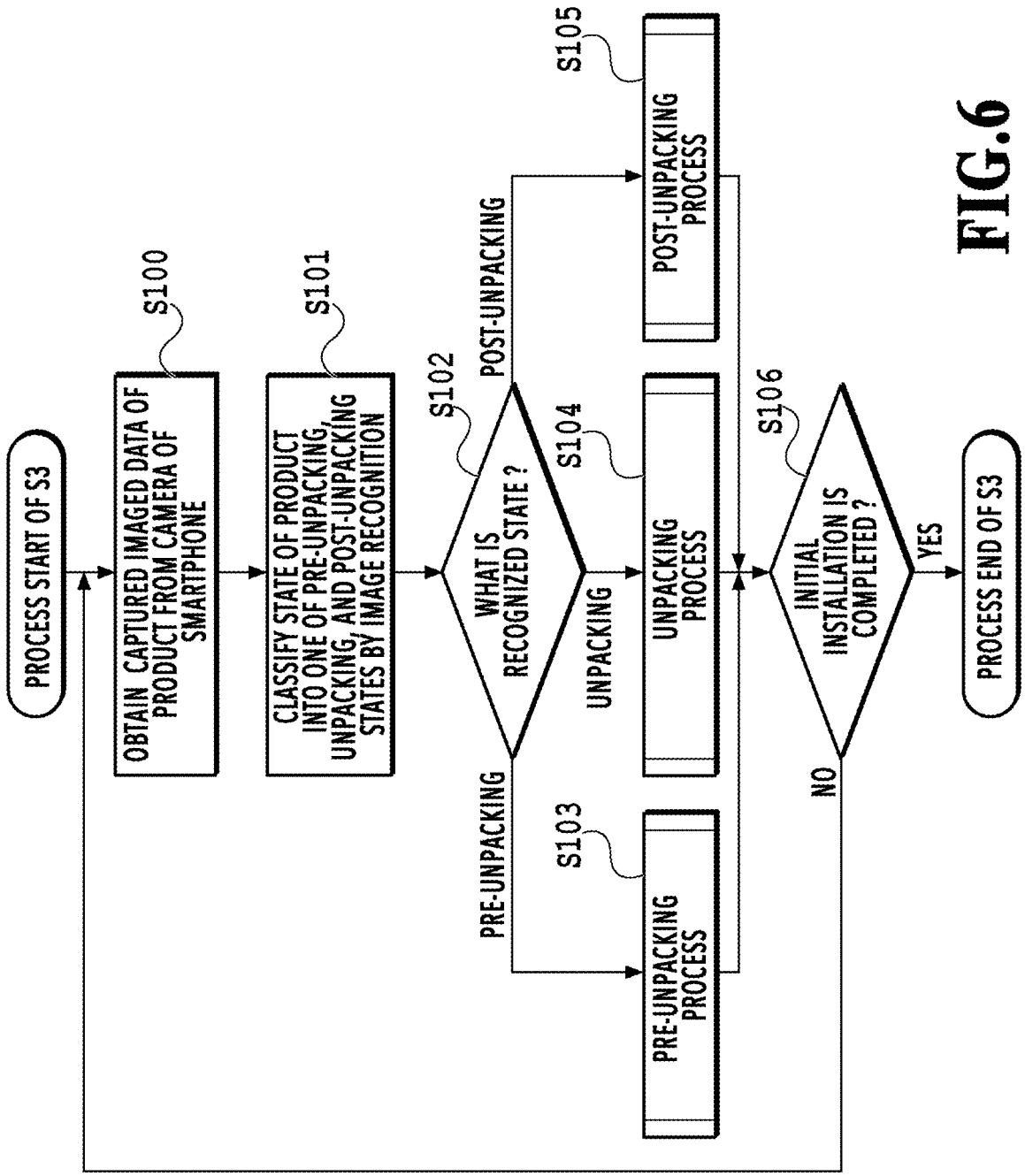
FIG. 6 is a flowchart illustrating a process of S3 in FIG. 5 in detail.

FIG. 6 is a flowchart illustrating a process of S3 in FIG. 5 in detail. In S100, the controller 203 obtains the captured image data of the product 10 being the target from the camera 202 of the smartphone 200. The product 10 referred herein includes not only the printer main body 100 but also objects covered with the various packaging materials 103 covering the printer main body 100. Next, in S101, the controller 203 analyzes the captured image data by image recognition and classifies the installation state of the product 10 into one of the following three states:

pre-unpacking state: a state in which the printer main body 100 is housed in the packaging box 101 and is unpacked;

post-unpacking state: a state in which all packaging materials 103 are removed from the printer main body 100;

unpacking state: a state other than the aforementioned two states such as a state in which some of the packaging materials 103 are attached to the printer main body 100.

As a method of analyzing the product image data, image recognition using machine learning such as deep learning and image recognition using pattern matching are conceivable. For example, in the case where the image recognition is performed by using deep learning, a neural network that is a learning model obtained by learning a large number of images capturing the product 10 in the aforementioned three states is prepared in the smartphone 200. Specifically, this learning model receives an image as input data and outputs percentages of the respective three states described above as output data (recognition result). The state corresponding to an output value with the highest percentage is thus the analysis result of the received image.

In learning of the learning model, the following pieces of data are prepared as learning data: the images of the product 10 in the aforementioned three states are prepared as input data and information indicating the states of the product 10 in the respective images are prepared as training data (correct answer data). Then, the training data and output data (recognition result) outputted by inputting the images being the input data into the learning model are provided to a loss function and a deviation amount from the correct answer of the recognition result is thus obtained. Weighting coefficients of connections between nodes in a neural network in the learning model and the like are updated such that deviation amounts L for many pieces of training data becomes smaller. Backpropagation is a method of adjusting the weighting coefficients of connections between nodes in each neural network such that the aforementioned errors become smaller. A nearest neighbor algorithm, a naive Bayes algorithm, a decision tree, a support vector machine, and the like can be given as specific algorithms of machine learning. Moreover, deep learning that generates characteristic amounts for learning and the weight coefficients of connections by itself by using a neural network can be given as the specific algorithm. Any of the aforementioned algorithms that are usable can be used and applied to the embodiment.

The controller 203 determines the state of the product 10 by inputting the image of the product 10 captured by the user with the smartphone 200 into the learning model generated as described above.

In the case where the controller 203 performs image recognition by using pattern matching, the controller 203 determines presence or absence of each identifier 105 by pattern matching. For example, in the case where the controller 203 recognizes an identifier that is present only before the unpacking, the controller 203 determines that the product 10 is in the pre-unpacking state. In the case where the controller 203 recognizes an identifier that is recognizable only after the unpacking, the controller 203 determines that the product 10 is being unpacked. Next, in S103, S104, and S105, the controller 203 selectively performs one of initial installation processes, specifically, a pre-unpacking process, an unpacking process, and a post-unpacking process, depending on the result of determining the state of the product. These processes are described in detail later.

Finally, in S106, the controller 203 determines whether all initial installation processes are completed. If the controller 203 confirms that all initial installation processes are completed, the controller 203 terminates the processing. If not, the controller 203 performs the aforementioned processes again from S101 one by one.

Figure 7:
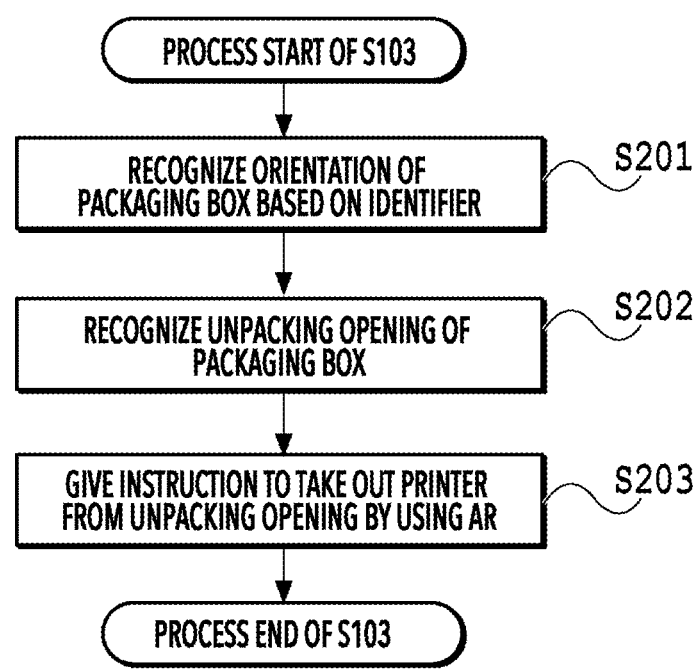
FIG. 7 is a flowchart illustrating a process of S103 in FIG. 6 in detail.

FIG. 7 is a flowchart illustrating the process of S103 in FIG. 6 in detail and illustrates the process before unpacking of the packaging box 101. First, in S201, the controller 203 recognizes the orientation of the packaging box 101 based on the identifier 105 obtained by the camera 202 of the smartphone 200. Specifically, the controller 203 recognizes the orientation of the packaging box 101 based on the type and angle of the identifier 105 recognized by image recognition. For example, assuming the case of FIG. 2, the controller 203 recognizes the identifier 105a of the packaging box 101 for the printer by image recognition. Assume that the controller 203 recognizes that the identifier 105a is oriented at 270 degrees with respect to the horizontal as a result of this recognition. The controller 203 combines this identifier information and "packaging box orientation identification data" obtained from the cloud server 300 and recognizes that the packaging box 101 is oriented at 270 degrees with respect to the horizontal.

Figure 14B:
FIGS. 14A to 14C are views illustrating examples of images displayed by an AR technology.
Figure 14A:
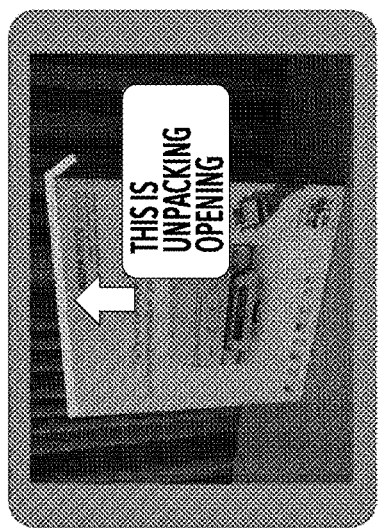
Figure 14C:
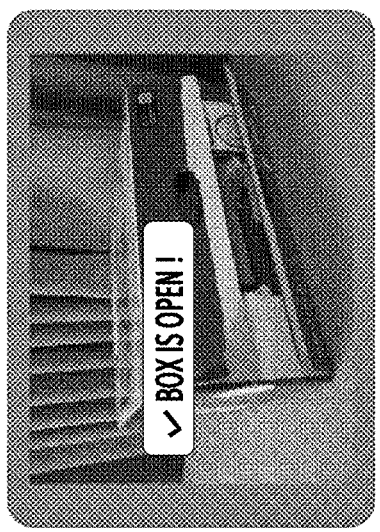

Next, in step S202, the controller 203 specifies the position of the unpacking opening OP by analyzing the orientation of the packaging box 101 and the "packaging box orientation identification data" obtained from the cloud server 300. Finally, in step S203, the controller 203 instructs the user to take out the printer from the unpacking opening by using AR technology. FIGS. 14A to 14C are views illustrating examples of images (AR images) displayed by using the AR technology. FIGS. 14A and 14B illustrate AR images before opening of the unpacking opening OP and FIG. 14C illustrates an AR image notifying the user of completion unpacking.

Figure 8:
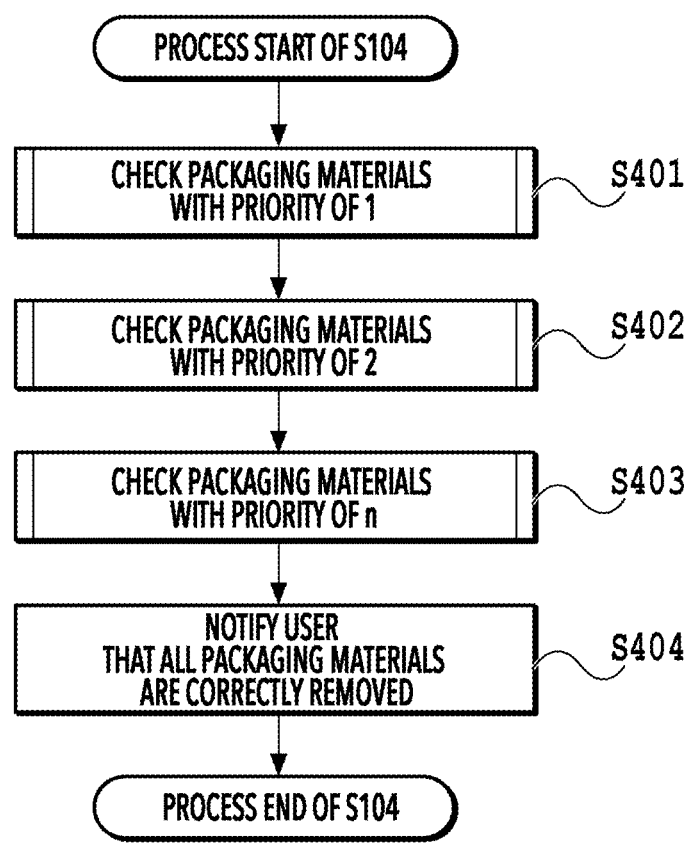
FIG. 8 is a flowchart illustrating a process of S104 in FIG. 6 in detail.

FIG. 8 is a flowchart illustrating the process of S104 in FIG. 6 in detail and illustrates the process in unpacking. In step S401 to S403, the controller 203 checks whether the packaging materials 103 are removed or not in the descending order of priority of the packaging materials 103 in the packaging material information table T. For example, in S401, the controller 203 checks whether the packaging materials with priority of 1 in the table T are present or absent one by one. In the case where at least one packaging material 103 with priority of 1 is present, the controller 203 performs AR guidance by using the display unit 204 of the smartphone 200 until confirming removable of the packaging material 103 with the priority of 1. Then, the controller 203 confirms removable of the packaging materials with priority of 2 and the packaging materials with priority of 3 one by one and, in the case where the packaging materials with priority of n are removed from the product 10, the processing proceeds to S404. In S404, the controller 203 displays a notification to the user indicating that all packaging materials 103 are correctly removed, on the display unit 204 of the smartphone 200 and terminates the process of S104.

Figure 9:
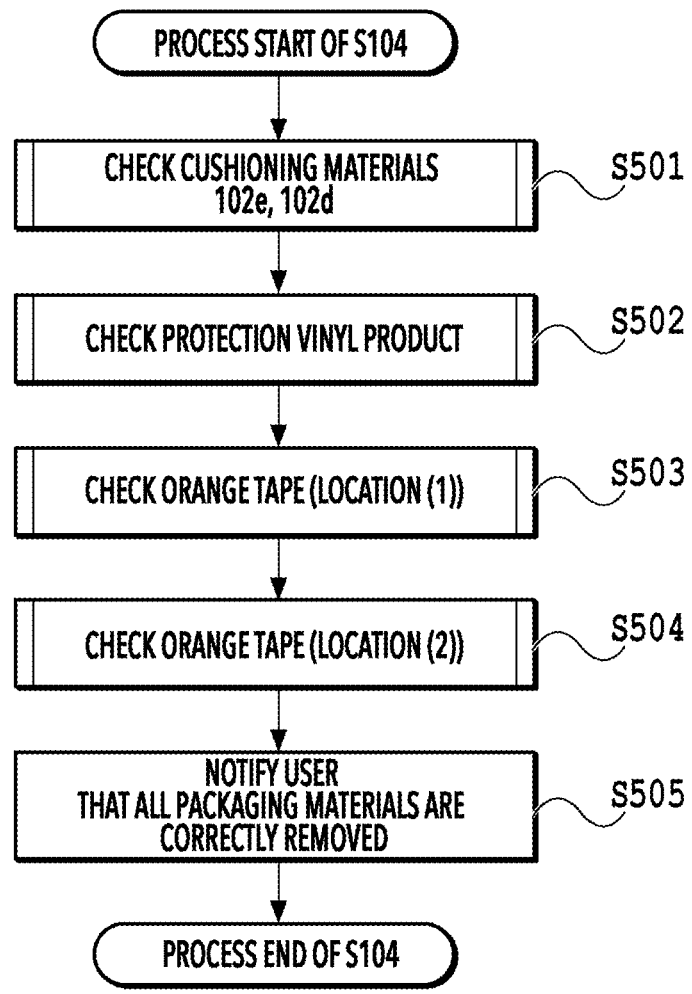
FIG. 9 is a flowchart illustrating a specific example of a process illustrated in FIG. 8.

FIG. 9 is a flowchart more specifically illustrating the process illustrated in FIG. 8. A specific check process performed by the controller 203 based on the table T of FIG. 5 is as illustrated in S501 to S505.

First, in S501, the controller 203 checks whether the fifth inner packaging material (left) 102e as a cushioning material and the fourth inner packaging material (right) 102d as a cushioning material that are the packaging materials with priority of 1 are present and performs AR guidance until determining that the fifth inner packaging material 102e and the fourth inner packaging material 102d are absent.

In S502, the controller 203 checks whether the protection vinyl product 102c that is the third inner packaging material with priority of 2 is present and performs AR guidance until determining that the third inner packaging material 102c is absent. In S503, the controller 203 checks whether the orange tape 102a that is the first inner packaging material with priority of 3 is present. The orange tape 102a is provided in the location [1] extending on both of a side surface and a front surface of the printer main body 100 and the controller 203 performs AR guidance until determining that the orange tape 102a is removed from the location [1] and is absent.

In S504, the controller 203 checks whether the orange tape 102b that is the second inner packaging material with priority of 4 is present. The second inner packaging material 102b is provided in a location [2] extending on both of the front surface and an upper surface of the printer main body 100 and the controller 203 performs AR guidance until determining that the second inner packaging material 102b is removed from the location [2] and is absent. Then, in S505, the controller 203 notifies the user that all packaging materials are correctly removed, by using the display unit 204 of the smartphone 200.

Figure 10:
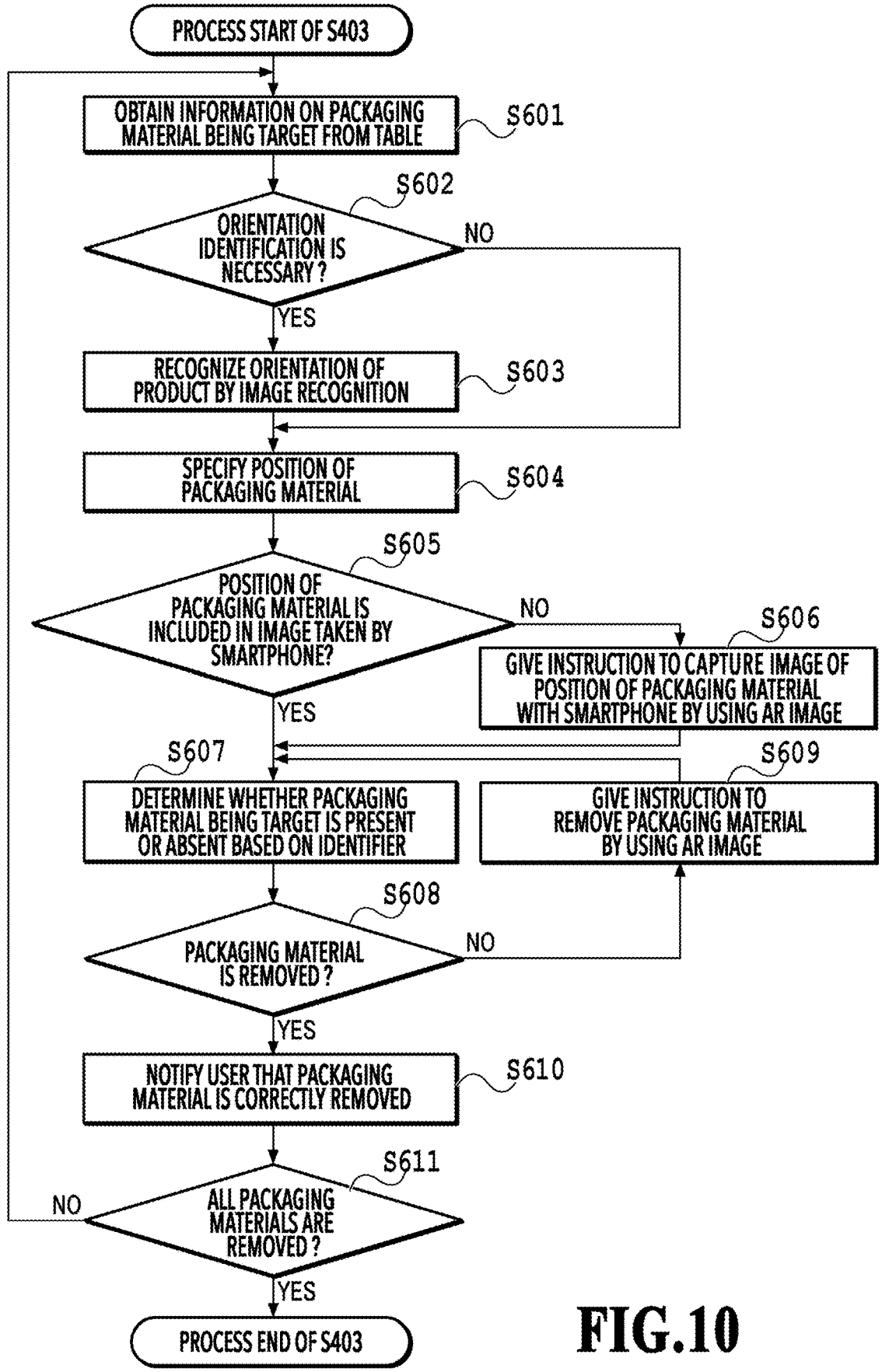
FIG. 10 is a flowchart illustrating a process of S403 in FIG. 8 in detail.

FIG. 10 is a flowchart illustrating the process of S403 in FIG. 8 in detail. FIG. 10 illustrates steps of checking the packaging materials 103 with priority of n one by one to check whether each packaging material 103 is correctly removed.

First, in S601, the controller 203 obtains information on the packaging material 103 being the target from the table T illustrated in FIG. 4. Next, in S602, the controller 203 determines whether the orientation of the product 10 needs to be identified to specify the position of the packaging material 103 being the target, based on the information obtained in S601. This determination is performed by obtaining information of "necessary" or "unnecessary" defined in the item of "orientation identification" corresponding to the packaging material being the target. In the case where the controller 203 determines that the orientation identification is necessary, in step S603, the controller 203 performs image recognition and analysis based on the captured image data of the product captured by the camera 202 of the smartphone 200 and determines the orientation of the product. A method using deep learning, pattern matching using the identifiers provided in the product, or the like is employed as a method of the image recognition.

Next, in S604, the controller 203 specifies the position of the packaging material 103 based on the position information in the table T and the orientation information of the product 10 determined in S603. The position information includes information indicating a portion of the product 10 where each of the packaging materials 103 is present. The controller 203 can specify the position of the packaging material 103 with respect to the captured image obtained by the camera 202 of the smartphone 200 by combining the position information and the orientation information.

Next, in S605, the controller 203 determines whether the captured image obtained by the camera 202 of the smartphone 200 includes the packaging material 103 of the product 10. If the controller 203 determines that the captured image does not include the packaging material 103, the processing proceeds to S606 and the controller 203 performs AR guidance instructing the user to take an image of the position where the packaging material 103 is provided with the camera 202 of the smartphone 200, on the display unit 204 of the smartphone 200.

Next, in S607, the controller 203 determines whether the packaging material 103 being the target of removable is present or absent based on the identifier 105. Specifically, in the case where the identifier 105 is configured to become exposed by the removal of the packaging material 103, the controller 203 determines that the packaging material 103 is removed if the image captured by the camera 202 includes the identifier 105. Meanwhile, in the case where the identifier 105 is provided in the packaging material 103, the controller 203 determines that the packaging material 103 is removed if the image captured by the camera 202 does not include the identifier.

Next, in S608, the controller 203 determines whether the packaging material 103 is removed. If the controller 203 determines that the packaging material 103 is not removed, the processing proceeds to S609 and the controller 203 performs AR guidance of prompting the user to remove the packaging material 103 on the display unit 204. Then, the processing returns to S607. If the controller 203 determines that the packaging material 103 is removed in S608, the processing proceeds to S610 and the controller 203 displays an AR image indicating that the packaging material 103 is correctly removed on the display unit 204. This notification allows the user to recognize that work is performed in an orderly manner. Accordingly, erroneous work such as returning the removed packaging material 103 to its original position is not performed.

Thereafter, in S611, the controller 203 determines whether all packaging materials 103 are removed. If the controller 203 determines that all packaging materials 103 are removed, the series of processes is terminated. If there is still a not-removed packaging material, the controller 203 continues performing the processes again from step S601.

Figure 11:
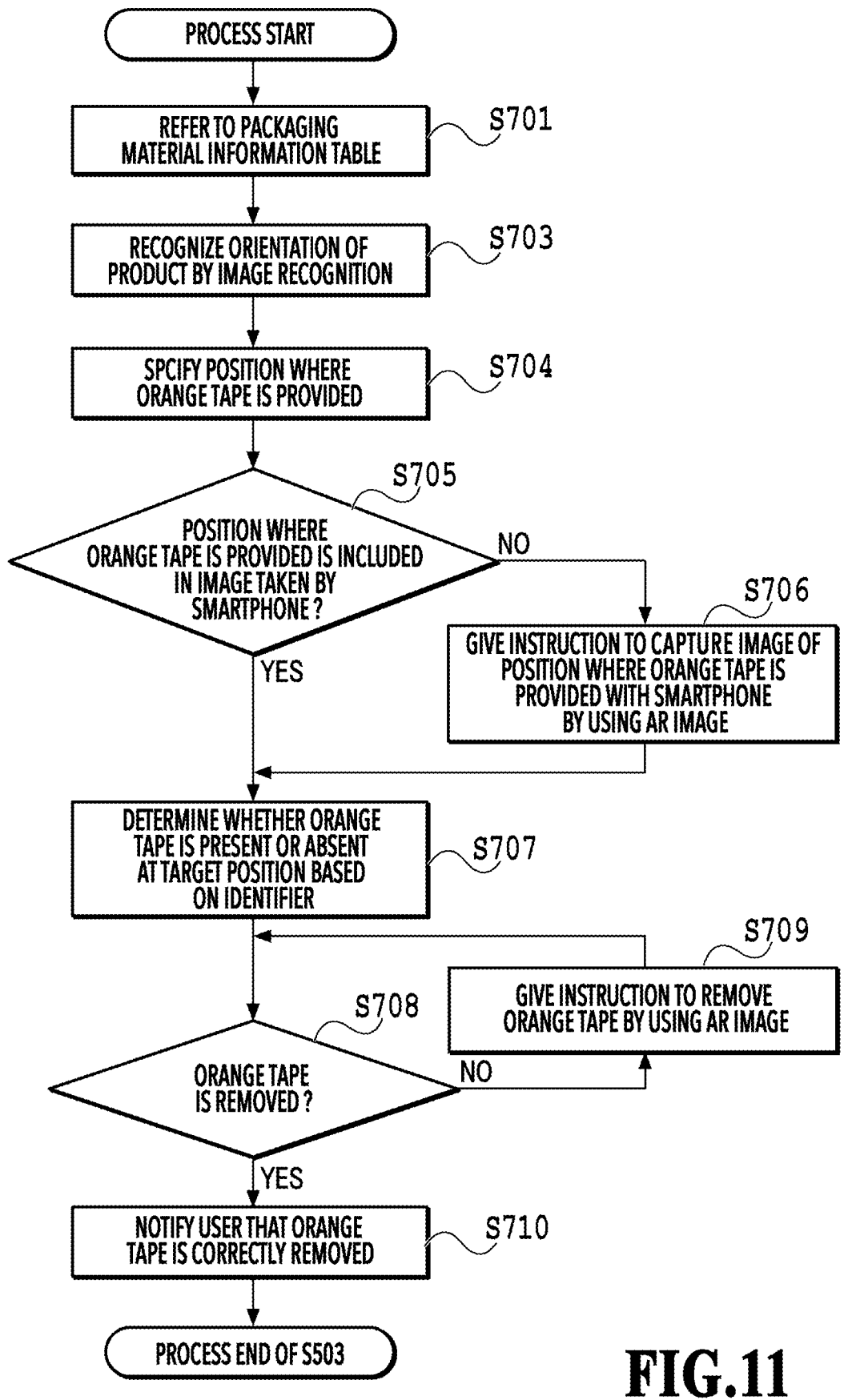
FIG. 11 is a flowchart more specifically illustrating a process of S503 in FIG. 9.

FIG. 11 is a flowchart more specifically illustrating the process of "checking the orange tape" described in S503 of FIG. 9. First, in S701, the controller 203 refers to the packaging material information table T and obtains information on the packaging material being the target. In this case, the packaging material 103 being the target is the orange tape and the controller 203 needs to recognize the orientation of the product 10 to specify the position of the orange tape. Accordingly, in the subsequent S703, the controller 203 recognizes the orientation of the product 10.

Next, in S704, the controller 203 specifies the position where the orange tape 102*a* is provided based on the position information obtained from the table T and the orientation information of the product recognized in S703. In S705, the controller 203 determines whether the position (target position) where the orange tape 102*a* is provided is included in the image captured by the camera 202 of the smartphone 200. If the controller 203 determines that the position where the orange tape 102*a* is provided is not captured, the processing proceeds to S706 and the controller 203 performs AR guidance instructing the user to take an image of the target position where the orange tape 102*a* is provided with the smartphone 200, on the display unit 204.

In step S707, the controller 203 determines whether the orange tape 102*a* is present or absent at the target position based on the identifier 105. Specifically, in the case where the identifier 105 is configured to be exposed by the removable of the orange tape 102*a*, the controller 203 determines that the orange tape is removed if the identifier 105 is present. Meanwhile, in the case where the orange tape has the function of the identifier, the controller 203 determines that the packaging material 103 is removed if the orange tape is absent.

Next, in S708, the controller 203 determines whether the orange tape 102*a* is removed. If the controller 203 determines that the orange tape 102*a* is not removed (NO), in S709, the controller 203 displays an AR image instructing the user to remove the orange tape 102*a* on the display unit 204. Meanwhile, if the controller 203 determines that the orange tape 102*a* is removed in S708, the controller 203 notifies the user of correct removal of the orange tape 102*a* via the display unit 204 in S710.

Figure 15B:
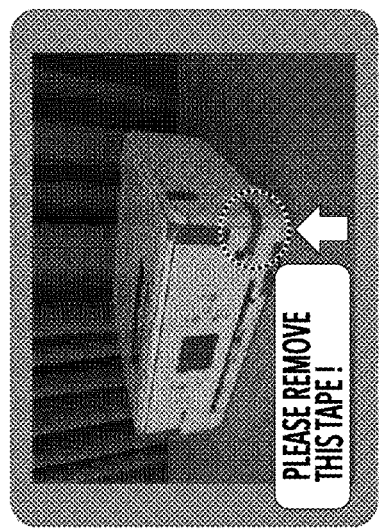
FIGS. 15A to 15C are views illustrating examples of AR images for giving instructions to a user by the AR technology.
Figure 15A:
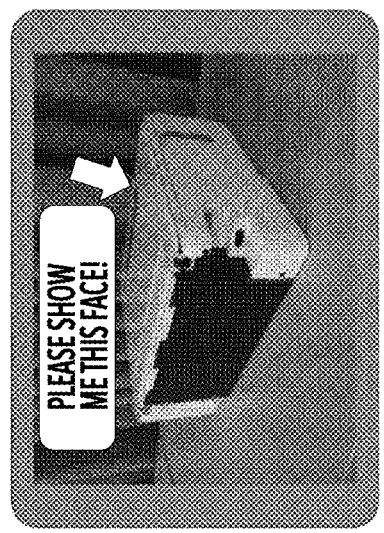
Figure 15C:
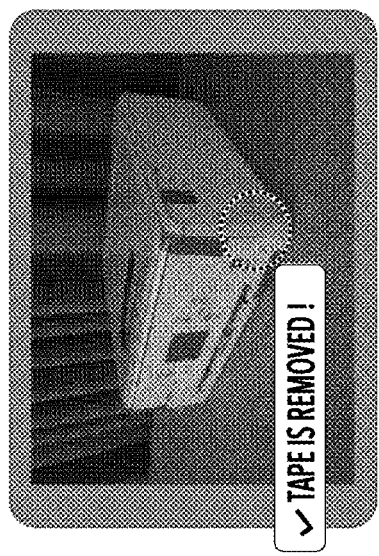

FIGS. 15A to 15C illustrate examples of AR images giving instructions to the user by using the AR technology. FIG. 15A is a view illustrating an AR image instructing the user to take an image of the position where the orange tape 102*a* is provided with the smartphone 200 in the process of S706 of FIG. 11. FIG. 15B is a view illustrating an AR image instructing the user to remove the orange tape in S709 of FIG. 11. FIG. 15C is a view illustrating an AR image notifying the user of correct removal of the packaging material 103 in S710 of FIG. 11.

Figure 12:
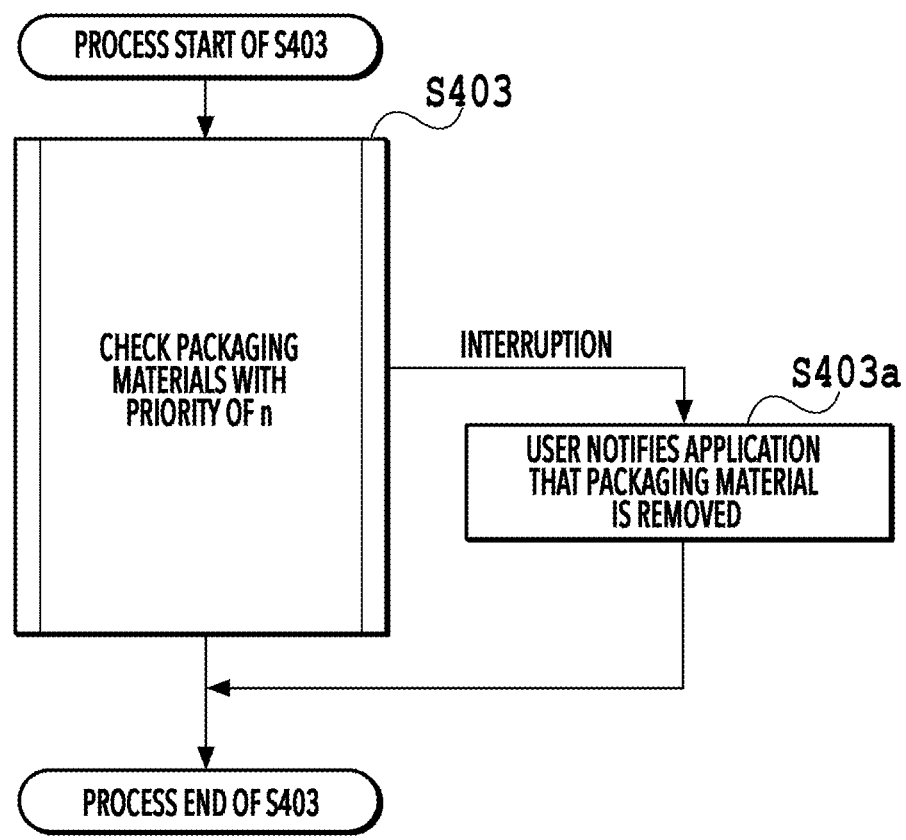
FIG. 12 is a flowchart illustrating an interruption process performed in the middle of the process of S403 in FIG. 8.

FIG. 12 is a flowchart illustrating an interruption process performed in the middle of the process of S403 in FIG. 8 to terminate the process by a user operation. In the case where the user inputs removal of the packaging material 103 being the target in the middle of the check process of the packaging material 103 with priority of n described in S403, the controller 203 executes the interruption process in S403a and terminates the process of S403. The controller 203 can thereby terminate the process of S403 at the moment where the user finishes removing the packaging material 103, without waiting for completion of all check processes illustrated in FIG. 8. Accordingly, it is possible to swiftly proceed to the subsequent post-unpacking process. A method of the user inputting the removal of the packaging material 103 being the target includes, for example, an input using a voice user interface (UI) or a touch input UI such as a complete button or a check box displayed in the display unit 204 of the smartphone 200.

Figure 13:
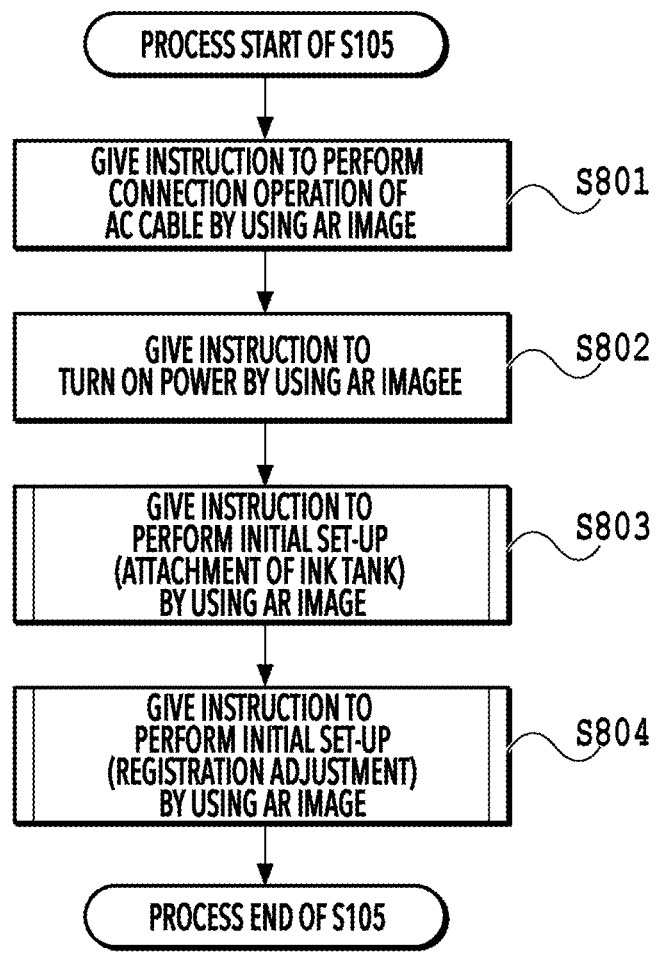
FIG. 13 is a flowchart specifically illustrating a process of S105 in FIG. 6.

FIG. 13 is a flowchart specifically illustrating the post-unpacking process in S105 of FIG. 6. First, in S801, the controller 203 instructs the user to connect an AC cable (attachment member) to the printer main body 100 by AR guidance. Specifically, the controller 203 displays an image of AR guidance that explicitly indicates a socket for the AC cable provided in the printer main body 100 and that instructs the user to perform an operation of connecting the AC cable to this socket on the display unit 204 of the smartphone 200.

Next, in S802, the controller 203 instructs the user to turn on the power by operating a soft key provided in the printer main body 100 by using an AR image. Specifically, the controller 203 explicitly indicates a power button provided in the printer main body 100 and gives an instruction on a method of operating the power button by using the AR image. The user can thereby perform work without confusion even if the power on operation includes an operation unique to the electronic device such as long-press of a power ON button.

Next, in S803 and S804, the controller 203 instructs the user to perform initial set-up work (initial setting work) on the printer main body 100 by using AR images. Specifically, in S803, the controller 203 instructs the user to attach an ink tank (attachment member) to the printer main body 100 by using an AR image. In this case, the controller 203 recognizes the ink tank by image recognition and performs guidance of correctly removing a packaging of the ink tank and then attaching the ink tank to a correct position in the printer main body 100. This can prevent occurrence of errors and the like that are caused by erroneous attachment of the ink tank or failure to remove the packaging material.

In S804, the controller 203 instructs the user to perform registration adjustment in the printer main body 100 by using an AR image. Specifically, the controller 203 instructs the user to perform setting of print sheets and operations on a UI provided in the printer main body 100 by using an AR image.

Other Embodiments

In the aforementioned embodiment, description is given of an example in which the guidance using the AR images is performed to assist the user in the unpacking work of the product 10 in which the printer main body 100 is packaged in the packaging materials 103. However, the present disclosure can be also applied to various products other than printers that require unpacking work. For example, installation work of personal computers and measurement devices that require complex unpacking work and setting work, large devices that require support by a service staff, and similar devices can be assisted by using the AR technology as in the aforementioned first embodiment by embedding identifier information in packaging materials and a device main body.

In the aforementioned first embodiment, description is given of the example in which the processes described in S3 of FIG. 5 are performed in the smartphone 200. However, the server 302 provided in the cloud server 300 may perform some of the processes described in S3 of FIG. 5. For example, since the cloud server 300 includes a processor such as a CPU like the smartphone 200, the cloud server 300 can perform the process of generating an AR image by superimposing information for performing AR guidance on an image captured by the camera of the smartphone 200. Then, the cloud server 300 can send the generated AR image from the cloud server 300 to the smartphone 200 to display the AR image on the display unit 204.

Moreover, although the example in which the guidance using the AR images is performed by using the information obtained from the cloud server is described in the aforementioned embodiment, the present disclosure is not limited to this configuration. Specifically, the AR images can be generated based only on information provided in a terminal such as the smartphone, without using an external server such as the cloud server. For example, it is possible to store an AR guidance application including table information as illustrated in FIG. 4 in the smartphone and perform the AR guidance without communicating with an external server.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{TM}$), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-199390 filed Oct. 31, 2019, which is hereby incorporated by reference wherein in its entirety.

What is claimed is:
1. An information processing method comprising:
an image capturing step of capturing an image of a product and obtaining captured image data;

a first obtaining step of obtaining product information relating to initial installation of the product based on the captured image data;

a second obtaining step of obtaining a determination result of an installation state of the product based on the captured image data and the product information;

a third obtaining step of obtaining combined image data expressing a combined image obtained by combining the captured image and an instruction image of installation work to be performed on the product by a user, depending on the determined installation state; and a display control step of causing a display unit to display the combined image based on the combined image data, wherein the product includes at least a device main body and a packaging material covering the device main body, wherein the product information obtained in the first obtaining step includes information on a method of determining that the packaging material is removed and information on whether it is necessary to identify an orientation of the product for identifying a position of the packaging material, and wherein, in the second obtaining step, the determination result of the installation state of the product is obtained based on the product information including the information on the method of determining that the packaging material is removed and the information on whether it is necessary to identify the orientation of the product for identifying the position of the packaging material.

2. The information processing method according to claim 1, wherein the product information includes information on the device main body and information on the packaging material.

3. The information processing method according to claim 1, wherein the second obtaining step includes obtaining a determination result of a state of the packaging material based on the captured image data of the product and the information on the packaging material.

4. The information processing method according to claim 3, wherein the second obtaining step includes obtaining a determination result indicating one of states of pre-unpacking, unpacking, and post-unpacking which the packaging material of product is in.

5. The information processing method according to claim 1, wherein
the third obtaining step includes obtaining AR image data obtained by combining the captured image data captured in the image capturing step and instruction image data giving an instruction of a method of removing the packaging material, and
the display control step includes causing the display unit to display an AR image according to the AR image data.

6. The information processing method according to claim 1, wherein the display control step includes causing the display unit to display an AR image obtained by combining the captured image captured in the image capturing step and an instruction image giving instructions of a method of attaching an attachment members to be attached to the device main body and a method of adjusting the device main body.

7. The information processing method according to claim 1, wherein at least the image capturing step, the first obtaining step, the second obtaining step, the third obtaining step, and the display control step are performed in a terminal operable by a user, the product information is stored in a server communicable with the terminal, and the first obtaining step includes obtaining the product information from the server by sending specification information specifying the product to the server.

8. The information processing method according to claim 7, wherein the specification information is information obtained by reading a two-dimensional code illustrated on an outer packaging material forming an outer surface of the product.

9. The information processing method according to claim 1, wherein the information on a method of determining that the packaging material is removed is information for identifying whether it is determined that the packaging material is removed by a first method in which it is determined that the packaging material is removed in a case where an identifier provided on the packaging material is absent at a target position or by a second method in which it is determined that the packaging material is removed in a case where an identifier provided on the packaging material is present at a target position.

10. The information processing method according to claim 1, wherein the information on whether it is necessary to identify the orientation of the product for identifying the position of the packaging material is information indicating that it is unnecessary to identify the orientation of the product in a case where the packaging material covers the entire product.

11. The information processing method according to claim 1, wherein the packaging material includes an outer packaging material forming an outer surface of the product and an inner packaging material housed in the outer packaging material and covering the device main body, and the outer packaging material and the inner packaging material are provided respectively with identifiers.

12. The information processing method according to claim 11, wherein the second obtaining step includes obtaining a determination result indicating a state of the packaging material based on presence or absence of the identifiers in the captured image data of the product and orientations of the identifiers in the captured image.

13. The information processing method according to claim 1, wherein in a case where it is determined in the second obtaining step that the packaging material is removed, an image indicating that the packaging material is removed is displayed on the display unit.

14. The information processing method according to claim 1, wherein the packaging material includes a packaging material with a first priority and a packaging material with a second priority lower than the first priority, and
wherein an image expressing removal of the packaging material is displayed in the display unit based on receiving an instruction from the user in the middle of checking whether or not the packaging material with the first priority is removed.

15. An information processing apparatus comprising:
a display control unit that causes a display unit capable of displaying a captured image of a product captured by an image capturing unit to display the captured image based on captured image data expressing the captured image;
a storage unit storing product information relating to initial installation of the product;

a first obtaining unit that obtains the product information from the storage unit;

a second obtaining unit that obtains a determination result of an installation state of the product based on the captured image data and the product information obtained by the first obtaining unit from the storage unit; and a third obtaining unit that obtains combined image data expressing a combined image obtained by combining the captured image captured by the image capturing unit and an instruction image of installation work to be performed on the product by a user, depending on the installation state obtained by the second obtaining unit, wherein the display control unit causes the display unit to display the combined image based on the combined image data, wherein the product includes at least a device main body and a packaging material covering the device main body, wherein the product information obtained in the first obtaining step includes information on a method of determining that the packaging material is removed and information on whether it is necessary to identify an orientation of the product for identifying a position of the packaging material, and wherein, in the second obtaining step, the determination result of the installation state of the product is obtained based on the product information including the information on the method of determining that the packaging material is removed and the information on whether it is necessary to identify the orientation of the product for identifying the position of the packaging material.

16. An information processing system comprising:

a display control unit that causes a display unit to display a captured image of a product captured by an image capturing unit based on captured image data expressing the captured image;

a first obtaining unit that obtains product information relating to initial setting of the product based on the captured image data;

a second obtaining unit that obtains a determination result of an installation state of the product based on the captured image data and the product information of the product; and a third obtaining unit that obtains combined image data expressing a combined image obtained by combining the captured image captured by the image capturing unit and an instruction image of installation work to be performed on the product by a user, depending on the installation state obtained by the second obtaining unit, wherein the display control unit causes the display unit to display the combined image based on the combined image data, wherein the product includes at least a device main body and a packaging material covering the device main body, wherein the product information obtained in the first obtaining step includes information on a method of determining that the packaging material is removed and information on whether it is necessary to identify an orientation of the product for identifying a position of the packaging material, and wherein, in the second obtaining step, the determination result of the installation state of the product is obtained based on the product information including the information on the method of determining that the packaging material is removed and the information on whether it is necessary to identify the orientation of the product for identifying the position of the packaging material.

* * * * *